May 21, 1929.　　　　J. A. DAVIS　　　　1,714,299
BOOKBINDING MACHINE
Filed Jan. 11, 1928　　　6 Sheets-Sheet 1

INVENTOR.
John A. Davis
BY
ATTORNEY.

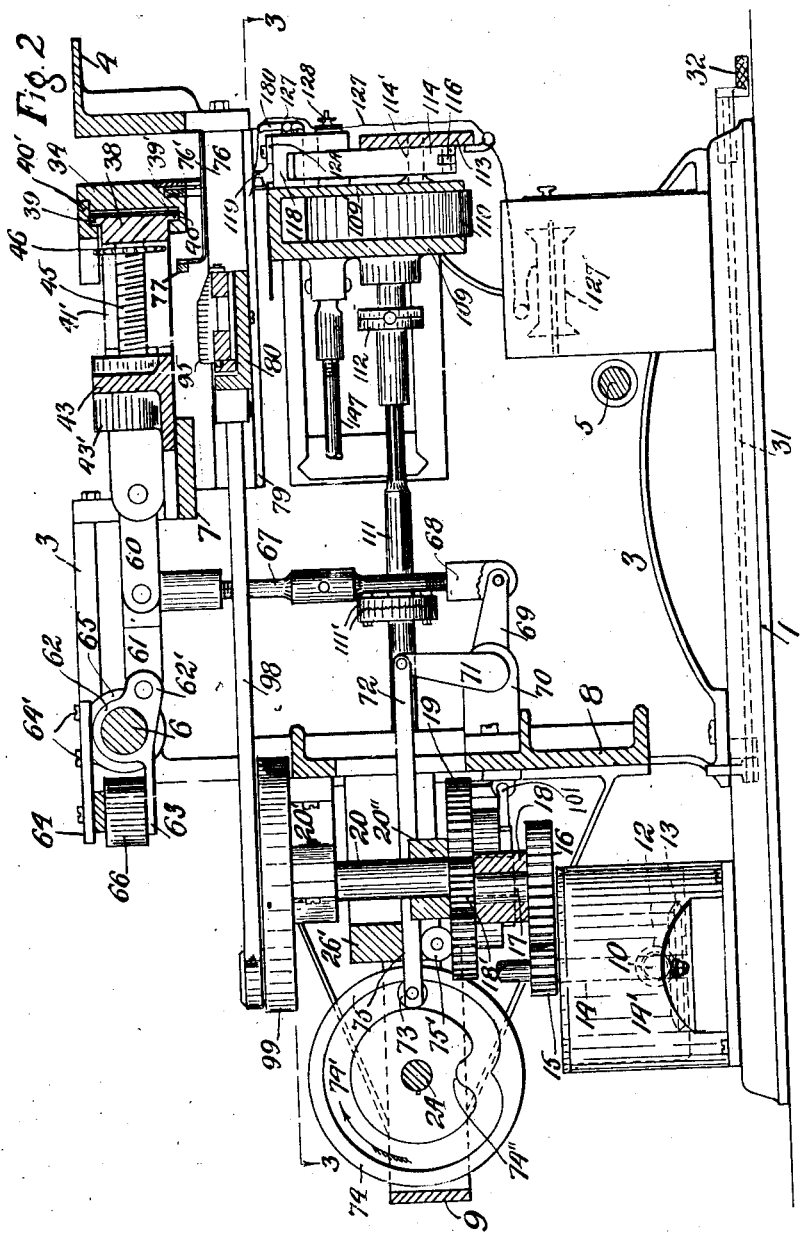

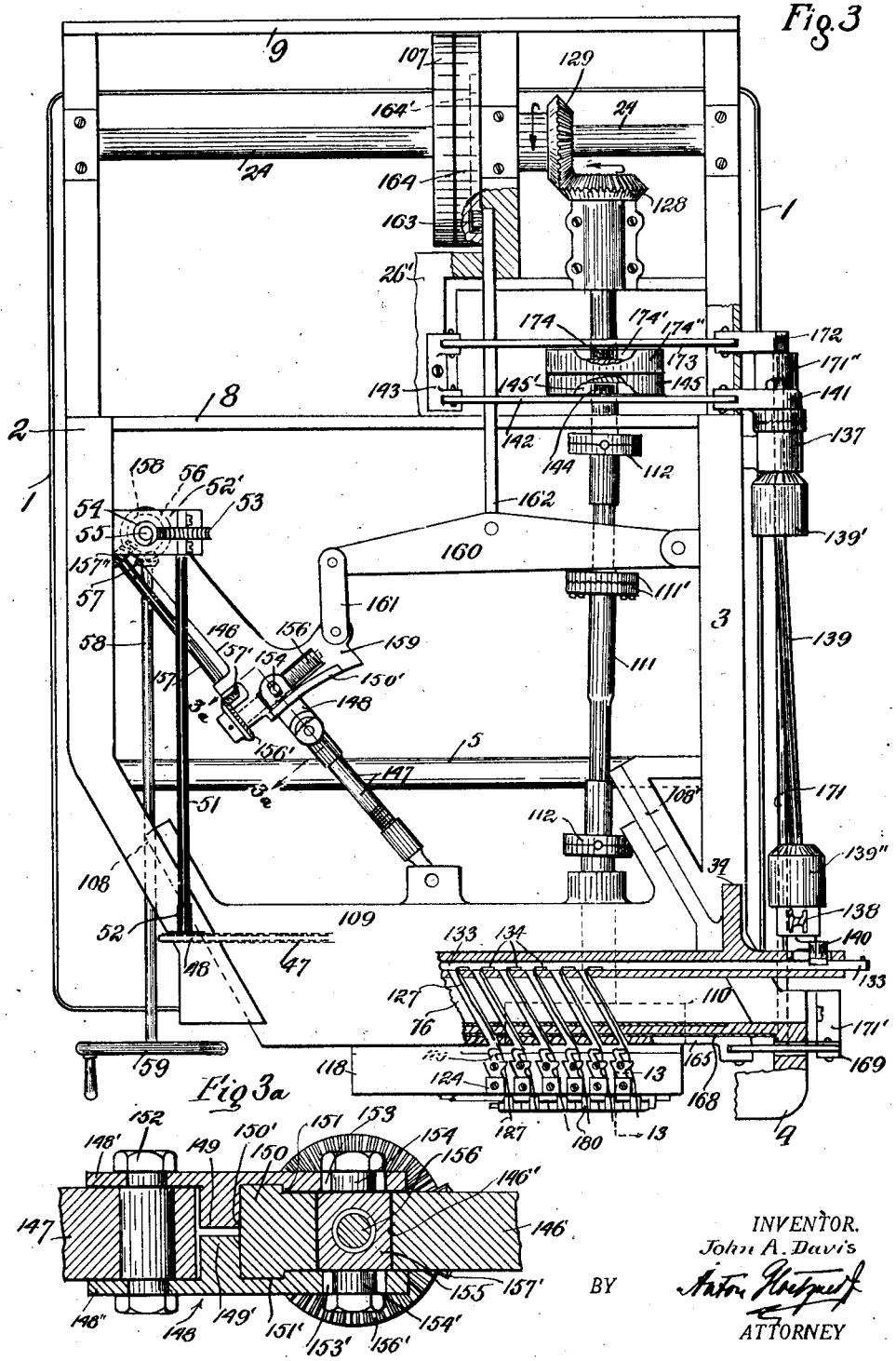

May 21, 1929.  J. A. DAVIS  1,714,299
BOOKBINDING MACHINE
Filed Jan. 11, 1928  6 Sheets-Sheet 4
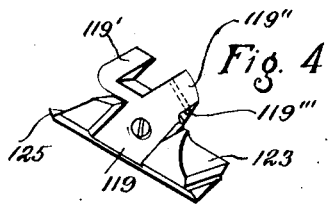
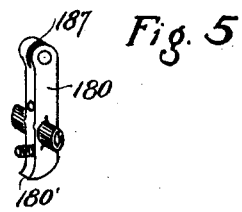
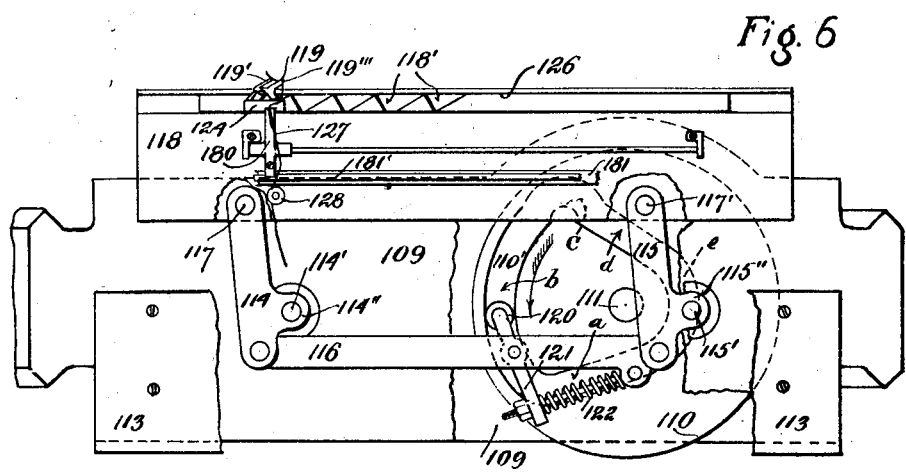
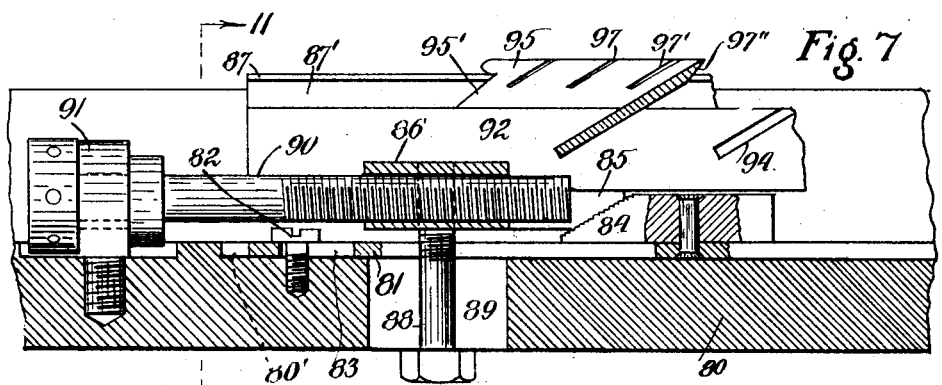
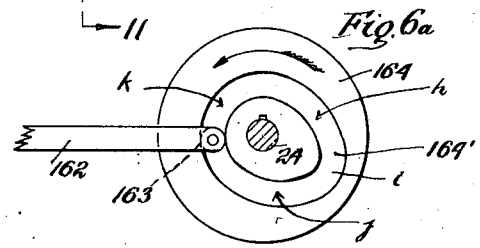
INVENTOR.
John A. Davis
BY
ATTORNEY.

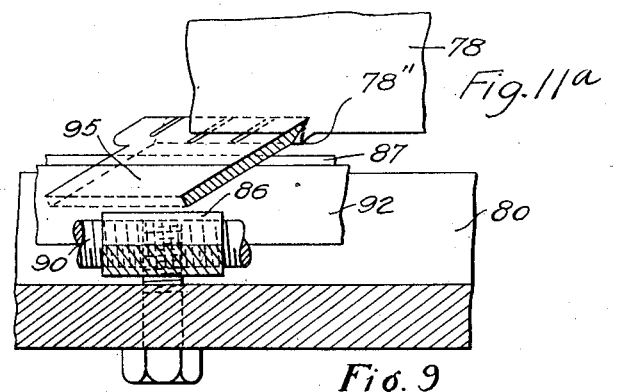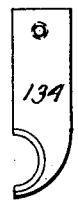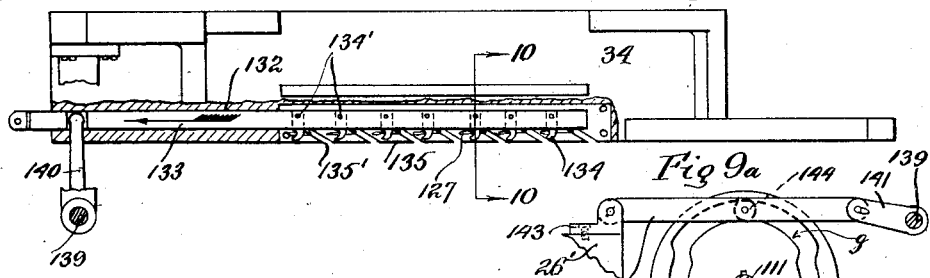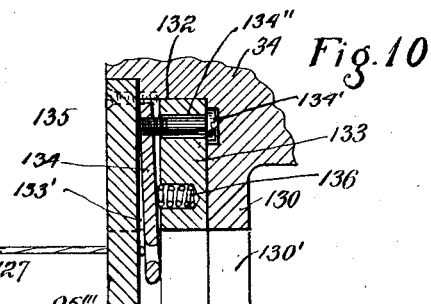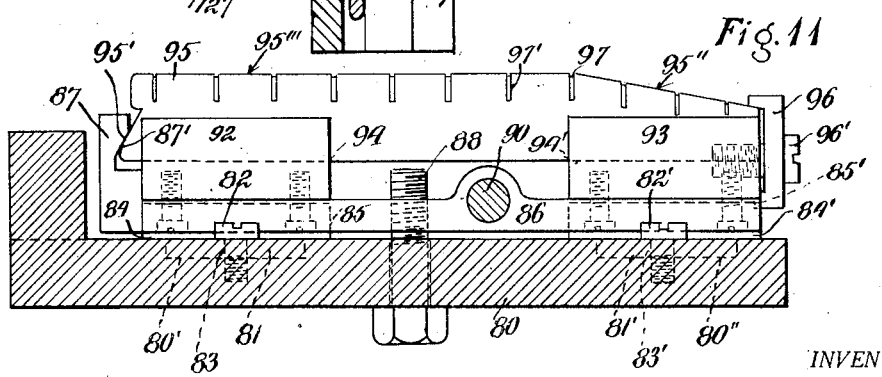

May 21, 1929.  J. A. DAVIS  1,714,299
BOOKBINDING MACHINE
Filed Jan. 11, 1928   6 Sheets-Sheet 6
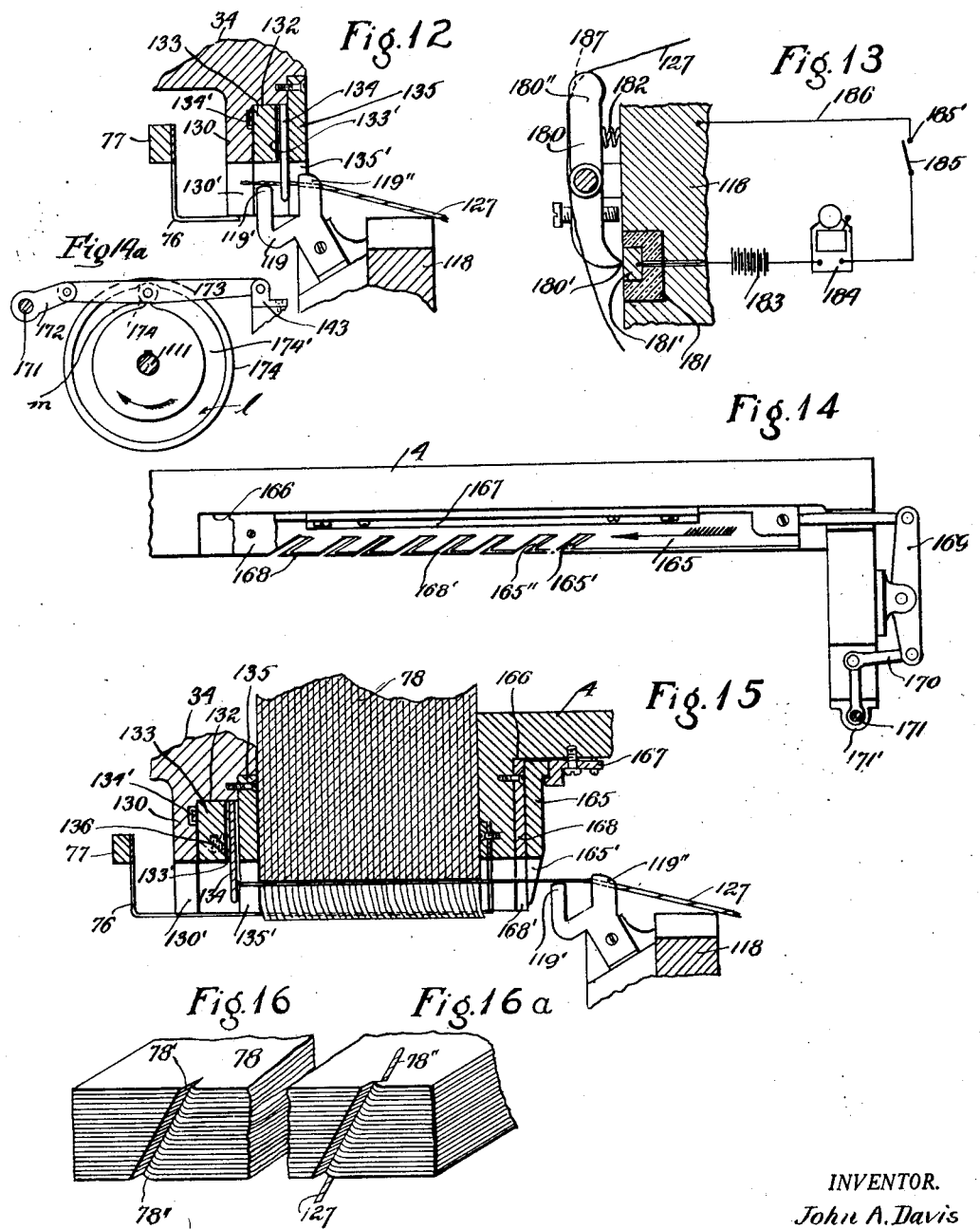
INVENTOR.
John A. Davis
BY
ATTORNEY.

Patented May 21, 1929.

1,714,299

UNITED STATES PATENT OFFICE.

JOHN A. DAVIS, OF LOS ANGELES, CALIFORNIA, ASSIGNOR TO OVERSEWING MACHINE COMPANY, A CORPORATION OF CALIFORNIA.

BOOKBINDING MACHINE.

Application filed January 11, 1928. Serial No. 245,962.

This invention relates to a machine for binding together signatures, leaves or pages to form a book unit and it has especial reference to a machine for executing the essential steps of methods of conjoining signatures, which are set forth in detail in U. S. Patent #1,575,978, granted to A. D. Dayton, March 9, 1927, and disclosed in my patent for method of binding books, No. 1,658,518, issued Feb. 7, 1928, the former of which patents involves providing oblique incisions across the back of the book and in the plane thereof, and inserting threads or other binding media in the incisions; and the latter of which involves providing oblique incisions across the back of, and in the plane of the alined signatures constituting a book, and deflecting or bending the loose edges or tongues at one side of the incisions from the plane of the signatures whereby they are interlocked. In the latter instance, threads, or other binding media are not needed. Both methods referred to may be carried out by the machine forming the subject matter of the present invention, the chief object of which is to provide co-operative mechanism in which the steps of either of the methods recited of conjoining signatures to form a book unit may be expeditiously carried out.

A form of embodiment of the invention is illustrated in the accompanying drawings, in which Fig. 1 is a plan view of a machine embodying my invention.

Fig. 1ª is a side view of one of the cams.

Fig. 2 is a sectional side elevation, the section being taken substantially on line 2—2 Fig. 1, and parts being omitted therefrom for clarity of illustration.

Fig. 3 is a plan section on line 3—3 Fig. 2.

Fig. 3ª is a fragmentary sectional detail on line 3ª—3ª, Fig. 3, looking in the direction of the arrows.

Fig. 4 is a perspective detail of one of the thread carriers.

Fig. 5 is a perspective detail of one of the contact members of the signalling system.

Fig. 6 is an enlarged detail front view of the carriage, the table associated therewith in which the thread carriers are mounted, and the operating means for the table.

Fig. 6ª is a side view of the cam for operating the carriage.

Figure 1:
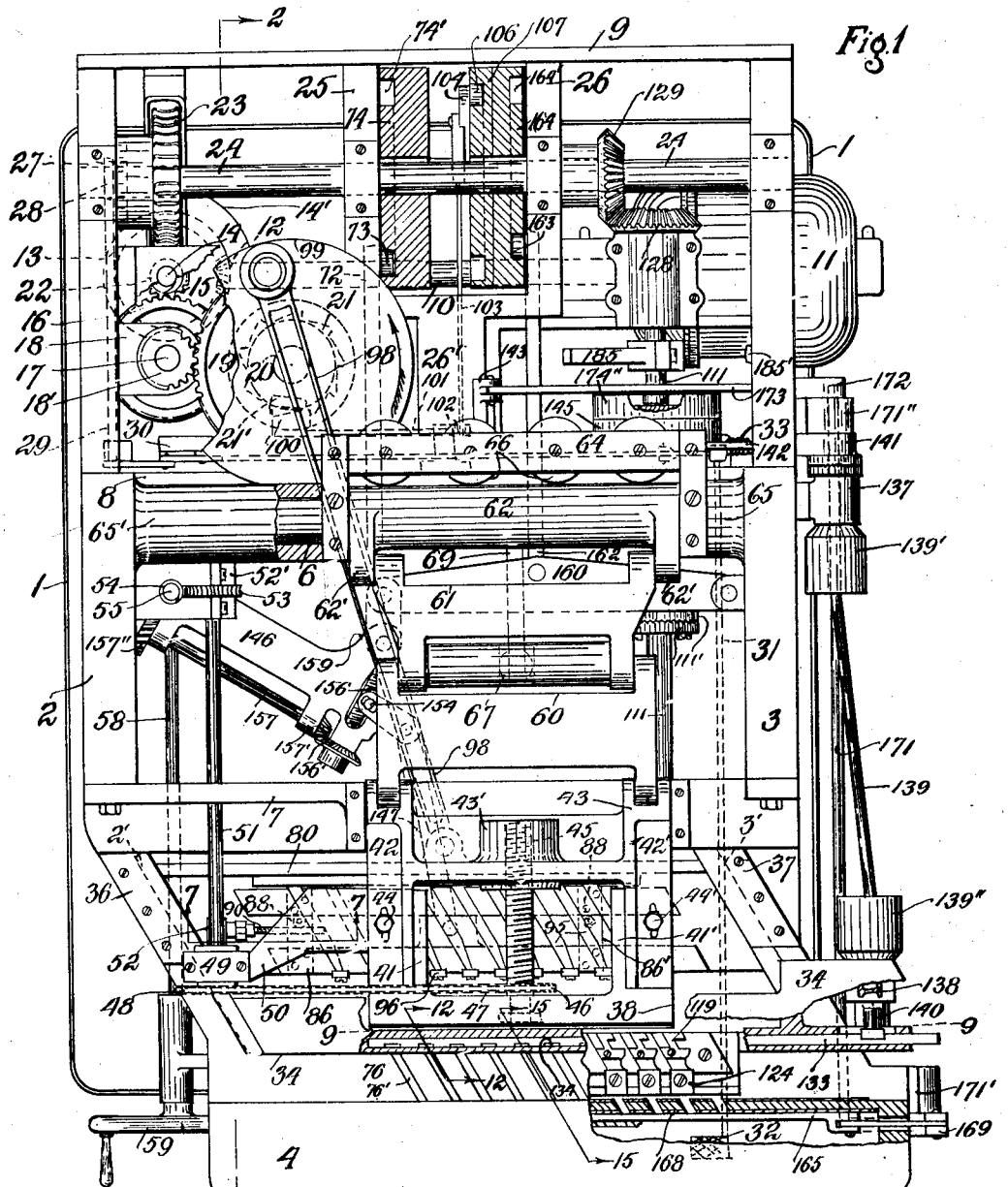
Figure 1A:
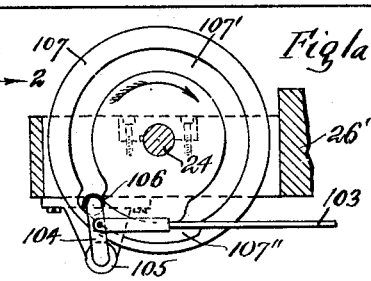

Fig. 7 is an enlarged fragmentary detail section on line 7—7, Fig. 1, illustrating the knives and the adjustment therefor.

Fig. 8 is an enlarged side view of one of the thread gripping members.

Fig. 9 is a detail rear view, partly in section, of the thread gripping mechanism, the section occurring approximately and substantially on line 9—9, Fig. 1, looking in the direction of the arrow.

Fig. 9ª is a front view of the cam for operating the thread gripping mechanism.

Fig. 10 is an enlarged fragmentary detail section on line 10—10, Fig. 9, showing the thread gripping mechanism.

Fig. 11 is a section on line 11—11, Fig. 7 showing the knife mounting and the adjusting mechanism therefor.

Fig. 11ª is a fragmentary detail view of a cross section through a blade and associated parts, showing the deflection of the signature tongues.

Fig. 12 is an enlarged fragmentary detail section on line 12—12, Fig. 1 looking in the direction of the arrow and showing the position of the thread carrier relative to the thread gripping means.

Fig. 13 is an enlarged detail section, substantially on line 13—13, Fig. 3 showing one of the contact members of the signalling system, and a diagram of an electric circuit for operating the signalling system.

Fig. 14 is a front view detail of the thread cutting mechanism.

Fig. 14ª is a rear elevation of the cam for operating the thread cutting mechanism.

Fig. 15 is an enlarged fragmentary detail section on line 15—15, Fig. 1, showing the thread carrying mechanism, the thread gripping mechanism and the thread cutting mechanism.

Fig. 16 is a fragmentary perspective view showing alined signatures provided with an oblique incision, the portion at one side of the incision being deflected relatively to the other side, and Fig. 16ª is a similar view showing a thread inlaid in the incision.

The machine forming the subject of the present invention includes means for clamping the book signatures; means for making incisions across the back of the signatures, and simultaneously deflecting the loose tongues at one side of the incision for interlocking the signatures, in accordance with the method described and claimed in my co-pending application for U. S. patent, filed Jan. 19, 1927, Ser. No. 162,061, and for the execution of which the elements mentioned constitutes a complete machine.

The machine also includes means for carrying or placing threads in the incisions and pressing them therein; means for holding the thread ends during the placement of the threads in the incisions; means to sever the threads after they have been lodged in the incisions; automatically controlled signalling means to indicate when any thread has failed to feed through the thread-placing or carrying means; and means to operate all of the mechanism and means stated, in the sequence in which they occur to effect the purposes of the invention, as heretofore related.

Each of the mechanisms and means and its structural composition, will be described in the order in which its function is performed, it being understood that the machine and its correlated parts as illustrated in the accompanying drawings, are exemplary merely of a preferred embodiment of the invention.

The frame.

Referring in detail to the drawings, and especially to Figs. 1, 2, and 3, the structure, upon which the various parts of the machine are mounted and in which they operate, is shown as comprising a base 1, provided at each side thereof with upstanding spaced frame members 2 and 3, which are conjoined to form a rigid and substantial frame structure by a table 4, which constitutes the stationary jaw of a clamping device, later to be referred to and described, by tie rods 5 and 6 and by cross members 7, 8, and 9.

Power transmission.

Power for operating the machine is derived from the shaft 10 of a prime mover, which is preferably an electric motor 11, mounted upon the base 1. On the end of this shaft 10 is fixedly secured a bevel pinion 12, which is in mesh with a horizontal bevel gear 13, that is keyed or otherwise secured to a vertical shaft 14, journaled in and extending through a suitable gear case 14′ on the base 1. Intermediate its length, this vertical shaft 14 is provided with a spur gear 15, which is arranged in mesh with a larger spur gear 16, secured to one end of a short shaft 17, that is journaled in a bracket 18 attached to the side frame member 2. To the other end of the short vertical shaft 17, is secured a spur gear 18′, which is in mesh with a large spur gear 19. This large spur gear 19 is loosely mounted upon a vertical shaft 20, which is journaled in bearings 20′ and 20″ attached to the cross member 8 of the frame structure, mutually engaging clutch members 21 and 21′ being respectively provided on the large spur gear 19 and the vertical shaft 20, and operable by means presently described, to lock the gear 19 with the shaft 20 and transmit its motion thereto.

To the upper end of the aforenamed vertical shaft 14 is secured a worm gear 22, (Fig. 1), which meshes with a worm wheel 23, loosely mounted upon a shaft 24 journaled in the side frame members 2 and 3, and also in intermediate bearings 25 and 26, in a suitable support 26′ attached to the cross member 8 of the frame structure and also to the cross member 9. The worm wheel 23 and the shaft 24 upon which it is rotatably mounted are provided with mutually engaging clutch devices or members 27 and 28 for locking the worm wheel 23 with the shaft 24 and causing the shaft 24 to rotate with the worm wheel. Since the clutch devices used and referred are of known construction and conventional type, a detailed description of them is deemed unnecessary, it being understood, and as hereinafter pointed out, that these clutch devices perform the function merely of transmitting rotary motion to the respective parts designated and to be designated to cause them to complete their respective relative cycles of operation. The means for causing the clutch members to engage one another comprises a system of levers 29 and 30, and an operating rod 31 for said levers, which rod 31 extends to the front of the machine as shown in Figs. 1 and 2, and is provided with a pedal 32 within convenient reach of the operators' foot. The operation of the levers 29 and 30 occurs against the tension of a spring 33, which, when pressure is removed from the pedal 32, returns said levers 29 and 30, and the connecting or operating rod 32, to a normally inoperative position. The clutch mechanism referred to being of the automatic throw-out type, it will be obvious that when the cycles of related operations have been sequentially performed, the disengagement of the clutch members occurs automatically, and the cycle-performing mechanism comes to rest.

The clamp and signature support.

A movable clamp jaw 34 co-operates with the aforenamed table 4 to clamp and hold a number of signatures 78, Fig. 15, in compressed position during the operation thereon by the various mechanisms to be described. The clamp jaw 34 is slidably mounted in ways 2′ and 3′, (Fig. 1), provided in the side frame members 2 and 3, and at an angle to the longitudinal axis of the machine, gibs 36 and 37, (Fig. 1), being employed to hold said movable clamp jaw 34 in place. With the movable jaw 34 is associated for slidable movement laterally relatively thereto and for longitudinal movement therewith a head 38. This head is provided with top and bottom flanges 39 and 39′, which fit in corresponding recessed ways 40 and 40′ in the jaw 34, the way 40 being formed in the rear and bottom of the jaw 34, and the way 40′ being provided by a flanged plate which is secured to the top of said jaw. By this construction, the movable jaw 34, which is mounted to travel in the oblique guide ways 2' and 3', may move laterally relative to and during the forward and rearward movement of the head 38, which travels in a rectilinear direction. The head 38 is provided with rearwardly extending angle bars 41 and 41' which are arranged to interfit with corresponding supporting angle bars 42 and 42' projecting from a casting 43 that is slidably mounted upon the cross-member 7. By means of cap screws 44 and 44', which extend through elongated slots in the horizontal portions of the angle bars 41 and 42 and 41' and 42', the head 38 and casting 43 are fixedly conjoined after adjustment of the head 38 and the clamp jaw 34 has been effected to regulate the distance of the movable jaw relatively to the fixed jaw or table 4, in conformity with the aggregate thickness of the signatures to be clamped. The adjustment of the movable jaw 34 relatively to the fixed jaw 4 is effected by a screw 45, which threads in a boss 43' in said casting 43 and which is rotatably connected with said head 38 in any desirable manner. On the screw 45 is mounted a sprocket wheel 46, which through the medium of a chain 47 is connected with a sprocket 48, having a hub 49, which is journaled in a bracket 50 connected to and extended laterally of the horizontal portion of the angle bar 41, of the head 38. The hub 49 of the sprocket wheel 48 is connected with one end of the shaft 51 for rotation therewith, by a feather key 52, which also permits a sliding movement of the sprocket 48 on the said shaft 51, so that the movement of the head 38 during adjustment, also carries with it the sprocket 48, without interfering with the rotative movement of the latter with the shaft 51. The other end of the shaft 51 is journaled in a support 52, and upon it is secured a worm whel 53, which is in mesh with a worm gear 54 on the upper end of a vertical shaft 55, that is also journaled in said support 52. A horizontal bevel gear 56 is fixed on the other or lower end of said vertical shaft 55, and in mesh with said horizontal gear 56 is a bevel pinion 57, carried upon the end of a shaft 58, suitably journaled in the frame. On the other end of said shaft 58 is fixedly secured a hand wheel 59, through the manual rotation of which the adjustment of the head 38 and movable clamp jaw 34 is effected, it being understood that before adjustment of the head 38 is possible, the pressure of the cap screws 44 and 44', which lock together the casting 43 and head 38, so that no strain during the clamping of the signatures is imposed upon the screw 45, is relieved.

The casting 43, and the movable clamp jaw 34 associated therewith, is arranged to be moved into operative and inoperative position, by jointed members 60 and 61, constituting a toggle. The member 60 is pivotally connected to the casting 43, and the member 61 is pivotally connected to ears 62' on a bearing 62 which is mounted upon the rod 6. The connection of said member 61 with the bearing 62 is below the axial center of said tie rod 6, as seen in Fig. 2. The bearing 62 is provided with a rearwardly extending ledge or shelf 63, between which and a plate 64, bolted on to inwardly extending portions 65 and 65' of the frame members 2 and 3 adjacent to the respective sides of said bearing 62, and through which the tie rod 6 extends, (Fig. 1), is interposed a cushioning means, preferably in the nature of resilient cylinders 66, which may be rubber, springs, air cushions, or any other desirable device that will afford a yielding resistance to the movement of said bearing 62 about its fulcrum which is the tie-rod 6. When the pressure exerted by the ledge or shelf 63 upon the yielding means 66 is excessive, the bolts 64', which hold the plate 64 secured to the portions 65 and 65' of the frame members, will break off, and thus prevent other injury to the machine.

The operation of the toggle members 60 and 61 is effected by a rod 67, which at one end is threadedly engaged with the knee of the toggle and at the other end is threadedly connected with a member 68, that is pivotally attached to one arm 69 of a bell-crank lever pivotally carried by a bracket 70, secured to the cross member 8. By reason of the threaded connection of the rod 67 with the knee of the toggle at one end and with the member 68 at the other end, the extent of the movement of the toggle may be regulated to exert the pressure needed. To the other arm 71 of the bell-crank lever is pivotally attached one end of a connecting rod 72. On the other end of said connecting rod 72 is journaled a roller 73 which is disposed in the cam groove 74' of a wheel 74, (Fig. 2), keyed or otherwise fastened to the shaft 24. This connecting rod 72 extends through and is guided in its reciprocatory movement by a slot 75 in the aforenamed support or bracket structure 26', and is supported by a roller 75'.

Support for the signatures to be operated upon is provided by a plate 76, which is fastened to the rear of the stationary jaw 4 and extends rearwardly therefrom and immediately under the movable clamp jaw 34. It is provided with a reinforcing bar 77 and with oblique slots 76', for purposes appearing presently.

From the position of the parts illustrated in Fig. 2, it will appear that the toggle members 60 and 61 have been substantially straightened, and that the movable clamp jaw 34 has thus been moved to clamping position. The movement of the toggle members has been effected by the rotation of the cam wheel 74, which is keyed or otherwise secured to the shaft 24, and the intermediate connecting instrumentalities described. The movable clamp jaw 34 is maintained in its operative position to hold the signatures clamped so long as the roller 73 on the end of the lever 72 travels in the concentric area of the cam groove 74' in the rotating wheel 74, during which time all of the mechanisms of the machine perform their respective functions in sequent order, as and in manner hereinafter pointed out. The groove 74', at one place in the circumferential extent thereof, is eccentric, as shown at 74", (Fig. 2), and this eccentric portion of the groove functions to operate said toggle members 60 and 61 and thereby to retract the movable jaw 34, the retraction occurring after each complete cycle of the interrelated mechanisms.

Slitting means.

When the signatures 78 have been clamped by the mechanism detailed and are held clamped in the manner described, the back edges of the signatures are slitted or provided with incisions 78' which extend obliquely across the alined signatures, and inwardly at an angle to the plane of the signatures, as shown in Figs. 16 and 16ª. Concurrently with the slitting of the signatures, the loose tongues 78", at one side of the slits or incisions are deflected from the plane of the signatures to produce an interlock between the signatures, as revealed in my Patent No. 1,658,518, issued Feb. 7, 1928, for method of binding books.

The devices and arrangements for accomplishing the slitting of the signatures and the simultaneous deflection of the loose tongues at one side of the slits or incisions, will now be described in detail.

Each of the side frame members 2 and 3 is provided with an oblique guide 79, (Fig. 2), upon which is mounted for reciprocal movement a slide 80, provided in the face thereof with elongated countersinks 80' and 80" in each of which is disposed a plate 81 and 81' respectively, (Figs. 7 and 11). These plates 81 and 81' are adjustable in the respective countersinks 80' and 80", cap screws 82 and 82', threading in said slide 80 and extending through slots 83 and 83' in said plates 81 and 81' serving to secure said plates in position of adjustment.

Upon each of said plates 81 and 81' is riveted or otherwise secured an incline 84 and 84', respectively, with which corresponding inclines 85 and 85' co-operate, for purposes presently appearing. The inclines 85 and 85' constitute integral parts of a plurality of transverse supports 86 and 86', (Fig. 1), which are interconnected at the rear by an upstanding wall or flange 87, and the inclines 85 and 85' of which are held in secure engagement with the corresponding inclines 84 and 84', by bolts 88, which thread into said supports and extend through slots 89 in the slide 80, as shown in Fig. 7.

By screw means 90, threadedly connected with the support 86, and held against longitudinal movement by a U-shaped yoke 91, secured to the slide 80, lateral movement of the supports 86 and 86', and of the inclines 85 and 85' thereon may be effected relatively to the inclines 84 and 84'. Thereby adjustment of the supports 86 and 86' to the required height may be made, it being understood that before any lateral operation of these supports is possible, the bolts 88 must first be loosened.

Upon and at right angles to the respective supports 86 and 86' are fastened spaced bars 92 and 93, each of which is provided with oblique grooves 94 and 94' extending at an angle to the vertical and arranged to receive a plurality of knives 95. The rear end of each of said knives 95 is inclined as seen at 95', (Figs. 7 and 11), the incline extending below the cutting edges of the knife and co-operating with a similarly inclined face 87' formed in the well or flange 87 of the supports 86 and 86' to hold the rear ends of the knives securely in their respective grooves 94 and 94'. The front ends of the knives 95 are held in position by clamps 96, which are secured to the bar 93 by bolts 96'.

To the extent of approximately one third of its length, the cutting edge of each blade or knife 95 declines toward the front end thereof, as seen at 95", and thereby is at an angle to the line of motion to facilitate the passage of the blades or knives through the back of the alined signatures and to produce incisions therein to the depth required. The balance of the cutting edge of each blade is in a horizontal plane, as seen at 95''', and this portion serves to straighten or complete to the depth required, the incisions initiated by the declining portion 95", so that the incisions will be of the same depth throughout the book.

I have found that a continuous sharp edge on a blade or knife is incapable of producing a satisfactory incision and that with certain classes and grades of papers, a smooth or substantially smooth cutting edge is wholly inoperative for cutting through a number of signatures. For this reason, I have designed the particular blade or knife shown at 95, (Fig. 11), from which it will be seen that the continuity of the cutting edge of each blade is interrupted by a plurality of equally spaced notches 97 of desirable depth, by reason of which notches the cutting edge presents a plurality of alined teeth. One side of each blade has a plane surface and is provided with grooves 97'. The other side of each blade is provided with a bevel edge 97", (Fig. 7), on which the knife or blade is arranged to be sharpened, and which sharpening is effected without interfering with the notches 97, that are provided by the grooves 97' on the plane side of each knife. In addition to the functions described, these grooves 97' serve to receive and carry away dust and paper particles produced by the incisory action of the blades 95. The bevel edge 97'' of each blade is provided mainly to bend or to deflect the loose tongues of the signatures at one side of each incision from the plane of the signatures and concurrently with the making on the incision, to provide an interlocking bond between respective signatures. Hence the knives or blades 95 are so designed that when forced through the signatures in the process of making incisions therein, the loose tongues at one side of the incisions are pushed forward as well as to one side. Incisions of this type permit the ready introduction of suitable binding or bonding fluid as glue, also of threads, when desired. After the application of the glue or other binding fluid, or threads, the incisions may be practically closed by pressing shut the incisions. When the incisions are thus pressed back, however, they (the tongues) never return to their original position in alinement with the undeflected side of the incisions, and, thereby, overlapping more or less the adjoining leaves, they become attached to adjoining leaves, by the glueing process which follows. This method of plowing or slitting the backs of signatures gives considerable strength to the glued-up back of the book so treated, and for certain classes and types of books, is entirely satisfactory, without the use of threads in the incisions. Adjustment of the blades or knives 95 is accomplished by the aforementioned screw means 90 in the manner and by the complementary mechanism previously detailed. Reciprocation of the knife-carrying slide 80 is produced by a crank arm 98, (Fig. 2), which at one end is pivotally associated with the slide 80, and at the other end is journaled on a crank 99 secured to the end of the previously mentioned vertical shaft 20, as shown in Fig. 2, upon which is loosely mounted also the gear 19. As previously described, this gear 19 is arranged to be connected with the shaft 20 to transmit thereto its rotary motion, by the clutch members, which in this instance comprise an internal ratchet 21, fixed to the gear 19, and a pawl 21', pivotally mounted on the shaft 20, the pawl 21' being under the tension of a spring, not shown, the tendency of which is to press or force the pawl 21' outwardly and into the path of the ratchet teeth. The pawl 21' is arranged to be held normally out of engagement with the ratchet teeth by a finger 100, mounted upon the end of a rock shaft 101, suitably journaled upon the cross member 8 of the frame. Upon the other end of said rock shaft 101 is mounted an arm 102, (Fig. 1), which by means of a rod 103, is pivotally attached to a link 104 intermediate the ends thereof, (Fig. 1ª). This link 104 at one end is journaled in a bracket 105 attached to the support 26', and at its other end is provided with a roller 106, disposed in a cam groove of a cam wheel 107, that is secured upon the shaft 24.

As seen in Fig. 1ª, this cam groove is composed of two substantially concentric portions 107' and 107'', lying in different circumferential planes. The portion 107'' occupies a lesser area than the portion 107' and serves to actuate the link 104 in one direction to cause the finger 100, through the described connections, to be moved out of engagement with the pawl 21' which under spring influence, is thrust into the path of one of the teeth of the ratchet 21, thereby establishing rotative connection between the gear 19 and the shaft 20. The cam groove 107'' also serves to hold said finger 100 out of engagement with the pawl 21' until the pawl 21' has rotated a sufficient distance to permit the elevation of said finger 100 into the path of the rotating pawl 21', which occurs when the link 104 is operated in the reverse direction by the roller 106 entering the cam groove portion 107'. The interengagement of the pawl 21' and ratchet 21 continues throughout one complete revolution of the gear 19 and the crank 99, and disengagement occurs when the pawl 21' is forced inwardly by wiping or passing over the finger 100, which transpires after the completion of a revolution of the gear 19 and its associated parts. During the interengagement of the pawl 21' and ratchet 21, and the consequent rotation of the crank 99, the knives 95 are caused to be moved forward, in the process of making incisions in the back of the book signatures, as seen in Figs. 16 and 16ª, then backward, coming to a complete stop at the original starting position, while the other mechanisms, later described, proceed to perform other functions.

The mechanical arrangement and structure thus far detailed, are complete per se for carrying out the essential steps of the method of binding books without the use of threads, which is set out and claimed in my co-pending application for patent above referred to, and which involves providing oblique incisions in the back of the book and simultaneously deflecting or bending the loose tongues at one side of the incisions from the plane of the signatures to produce an interlock, as seen in Figs. 16 and 16ª.

Other automatic mechanism co-operates with the mechanical organization heretofore described to carry out the essential steps of that method of binding books, which is revealed in U. S. Patent #1,575,978, issued March 9, 1926, to A. D. Dayton, and which involves providing oblique incisions across the back of the book, and in inlaying threads in the incisions.

Each of the various mechanisms for carrying out the various functions required in the execution of this process of binding books, will now be described in the order in which they operate.

*Thread-inlaying mechanism.*

The side members 2 and 3 of the frame structure are formed with guideways 108 and 108' respectively in which is mounted for reciprocal movement a carriage 109 that is disposed immediately below and underneath the knife-carrying slide 80, as seen in Fig. 2. The carriage 109 in cross-section is substantially an inverted U, in which is positioned for periodical rotation, as described later, a cam wheel 110, (Fig. 6), which is secured to the end of a shaft 111 extending through the rear wall of the U. To enable the shaft 111 to move in an oblique plane in accordance with the movement of the carriage, the shaft is composed of a number of sections connected by universal joints 112, and to enable the carriage to reciprocate with and during the rotative operation of the cam 110, other sections of the shaft 111 on which the cam is mounted are conjoined for relative longitudinal movement by any well known mutually engaging means, which need no particular description. Mutually engaging serrated disks 111' are provided on sections of the shaft 111 to effect relative rotation of such shaft sections and adjustment of the cam wheel 110 and thereby synchronize its movement with the complementary mechanism of the machine. When adjustment of one of these disks 111' has been made, relatively to the other, they are firmly bolted together, as shown in Figs. 1 and 2. The cam wheel 110 is provided with a cam groove 110' of a form necessary to produce a plurality of consecutive movements of the thread-carrying elements, as later described. To the front wall 109' of the carriage 109, but spaced therefrom, is secured a cover plate 113. Between the front wall 109' and the cover plate 113 are pivotally mounted a plurality of substantially vertical levers 114 and 115, the pins 114' and 115' mounting same extending through offset ears 114" and 115" on and intermediate the ends of said levers 114 and 115 and through said front wall 109' and said cover plate 113. The levers 114 and 115 at the bottom are connected by a horizontal bar 116, that is pivotally attached to said vertical levers 114 and 115. To the other ends of said vertical levers 114 and 115 is pivotally connected by pins 117 and 117', a table 118 upon the face of which is set or mounted, in manner presently explained, a plurality of thread-carrying devices 119. This table 118 which is parallel with the horizontal bar 116, in combination with the vertical levers 114 and 115, completes substantially a quadrilateral or parallelogram, motion to which is arranged to be imparted by the cam groove 110' through the medium of a roller 120, arranged to ride in the cam groove 110' and journaled in one end of an arm 121. This arm 121 is pivotally connected intermediate its ends to the horizontal bar 116, while the other end of said arm 121 is under the tension of an adjustable spring 122.

As seen in Fig. 6, the table 118 is provided with a plurality of oblique grooves 118', of V-shaped formation to accommodate a plurality of similarly formed bars 123, (Fig. 4), which are arranged to be held securely in the V-shaped grooves 118' by clamps 124, that engage the front ends of said bars 123 and that are arranged to be secured to the table 118, (Figs. 1, 2, 3, and 6). The rear ends of these bars 123 are provided with projections 125, (Fig. 4), which are arranged to extend under a lip 126, formed on the table 118, by which the rear ends of the bars 123 are held locked in the grooves 118' of the table 118. To the bars 123 are fastened by any desirable means, the aforenamed thread-carrying devices 119, which as seen in Fig. 4, are disposed thereon obliquely and at an angle to the horizontal in conformity with the incisions 78' priorly made in the signatures 78, (Figs. 16 and 16ª).

As seen in Fig. 4, these thread-carrying devices 119 are each formed with two spaced taper prongs 119' and 119", designed to conform substantially to the shape of the incisions 78'. The prongs 119" are each provided with perforations 119''', (Fig. 4), to receive the threads 127, (Fig. 6), that are arranged to be laid into the incisions 78'. The prongs 119', which are in alinement with the prongs 119" function to seat the threads 127 in the bottoms of the incisions, as pointed out presently. Rotation of the shaft 111, and the cam wheel 110 mounted thereon is effected by a bevel gear 128 secured to the rear end of said shaft 111, and meshing with a bevel gear 129, that is keyed or otherwise secured to the aforenamed driving shaft 24, (Figs. 1 and 3). The cam groove 110', as shown in Fig. 6, is divided into a plurality of sections, $a$, $b$, $c$, $d$, and $e$, by means of which the table 118 mounting the thread-carrying devices 119, is carried through a number of positions in sequent order to cause the thread-carrying devices to inlay the threads into the respective incisions 78' in the signatures 78, in manner now described.

In the position of the cam 110 illustrated in Fig. 6, the table 118 has been elevated to its highest position relatively to the carriage 109, (Fig. 12), and thereby the thread-carrying devices 119 have been brought into alinement with the incisions 78' in the signatures. The elevation of the table 118 has been effected by that portion of the cam groove indicated at $a$ which has operated against the roller 120, and thereby caused an upward swing of the parallelogram of which the threader table 118 is an essential complement. In its elevated position the table 118 is held for a determinate period by the portion or section *b* of the cam groove 110, which is concentric. The loose ends of the threads 127, which pass through the perforation in the prongs 119' of the thread-carrying devices 119, extend past the space between the prongs 119' and 119" and beyond the prong 119", as seen in Fig. 12. When the elevation of the table 118 has occurred, as before explained, so that the thread-carrying devices 119 are in accurate alinement with the incisions 78', the loose ends of the threads are gripped and held for a determinate length of time. The various threads 127 employed are paid off from spools 127', (Fig. 2), and from Figs. 2 and 6, it will be seen that these threads pass over usual tension devices 128, secured to the front of the table 118. Since the next operation of the machine is the gripping of the thread ends, I will now describe in detail the mechanism for doing this.

*Thread gripping mechanism.*

The movable clamp jaw 34, heretofore referred to, is formed with a dependent flange or extension 130 rearwardly of the face thereof, as seen in Figs. 10, 12, and 15, and such flange or extension is provided with oblique slots 130', inclined at an angle to the vertical and in register with the slots 76' in the signature support 76, and with the incisions 78' in the signatures 78, as shown in Figs. 1, 2, 3, and 15. The movable jaw 34, is provided with a recess 132, in which is disposed for lateral operation therein a bar 133. This bar 133 is formed with a plurality of vertical grooves 133' in which are received a plurality of fingers or hooks 134, that are arranged to be suspended from said bar 133 by screws 134', threading in said fingers or hooks 134, and fitting loosely in holes 134" provided for them in the bar 133. The hook ends of the fingers 134 extend below the bottom of the bar 133, as seen in Fig. 10, and in normally inoperative position lie between the slots 130' formed in the flange or extension 130 of the movable jaw 34, and the slots 135' formed in a plate 135, (Fig. 9), which is fastened to the front of the jaw 34, and is flush therewith. The movement of the fingers 134, therefore, occurs relatively to the slots 130' and 135' respectively, as and for the purpose presently pointed out. Pivotal movement of said fingers 134, as is apparent, is prevented by the walls of the grooves 133' in which they are contained, but owing to the loosely fitting support for the fingers 134, as described, they are capable of a slight movement transversely relative to the plane surface of the plate 135, against which they are held normally pressed by helical springs 136 housed in the bar 133. Means for periodically operating said bar 133, at one time to grip the thread ends and hold them for a determinate period, and at another time to release the threads, is shown more clearly in Figs. 1 and 3. In suitable bearings 137, on the frame member 3, and 138 on the movable jaw 34, is journaled a shaft 139, provided with two universal joints 139' and 139" so constructed as to enable the shaft to move in an oblique direction and to reciprocate with the movable jaw 34. On the front end of the shaft 139 is keyed an arm 140, (Fig. 9), the end of which is connected in any suitable manner with the afore described bar 133. On to the other end of the shaft 139 is secured a link 141 to which is pivotally attached one end of a lever 142, the other end of which is fulcrumed in a suitable support 143, attached to the support 26' heretofore referred to, and illustrated in Fig. 3. Intermediate the ends of said lever 142 is journaled a roller 144, which is disposed in the cam groove 145' of a wheel 145, mounted upon the shaft 111. The cam groove 145' is composed of two conjoined concentric sections *f* and *g* (Fig. 9ª), lying in different circumferential planes, by which the roller 144 disposed therein will be elevated when it is shifted from the groove section *f* onto the groove section *g* during the relative rotation of the when 145, thereby also imparting an upward movement to the lever 142 and a partial axial revolution to the shaft 139. By this partial revolution of the shaft 139, the bar 133 is moved relative to the movable jaw 34, but the operation of the bar 133 does not take place until the prongs 119' and 119", (Fig. 12), respectively have entered into the slots 135' and 130' respectively, in the movable jaw 34 and the plate 135, and delivered into said slots the threads 127, which as seen in Fig. 12, are now in the direct path of movement of the fingers 134. While the table 118, with the thread-carrying devices 119 is maintained in the elevated position shown in Fig. 6, by the cam 110, the bar 133, is operated by the cam 145, through the various connections described, in the direction of the arrow, (Fig. 9). This movement of the bar 133 carries the hook ends of the fingers 134 past the slots 135' in the plate 135, thereby causing the threads 127 held in the slots by the thread-carrying devices 119 to be wedged between the fingers 134 and the inside surface of the plate 135, between the various slots, as shown in Fig. 9. The thread ends 127 are then held gripped for a determinate period of time which is governed by the traverse of the section *g* of the cam groove 145', relative to the roller 144. The release of the threads 127 occurs when the roller 144 shifts from the cam groove section *g* to the cam groove section *f* and transfers its movement through the connection detailed to the finger bar 133 in the reverse direction. Now, while the thread ends 127, are held by the fingers, and the table 118, mounting the thread-carrying devices 119, is held in elevated position by the groove section b of the cam 110, the carriage 109 upon which said table 118 is mounted and relatively to which it is movable, is arranged to be moved in a forward direction as shown in Fig. 3, by the means now described, to cause the prongs 119' through which the threads 127 extend, to pass through the incisions 78' in the signatures 78 and inlay the threads therein.

Movement of the carriage 109 in a forward and rearward direction is effected by a compensating arm 146 fulcrumed in the side member 2 of the frame structure, through the medium of a connecting rod 147, that is pivotally connected at one end to a link 148, which is adjustably associated with said compensating arm, for the purpose presently pointed out. The other end of said connecting rod is pivotally connected with the rear of the carriage, as shown in Fig. 3. Said compensating arm is provided with an extension 159 which is connected with one end of a lever 160 through the medium of a link 161. The other end of said lever 160 is fulcrumed in the side member 3 of the frame structure. To this lever 160 and approximately centrally thereof is pivoted a rod 162 journaling a roller 163 that is disposed in the cam groove 164' of a cam wheel 164 keyed upon the aforementioned shaft 24. The cam groove 164' is composed of conjoined sections h, i, j, and k, (Fig. 6ª), the sections i and k being substantially concentric and the section i operating to produce a pause in the reciprocation of the carriage 109. While the thread ends are held by the fingers 134, the carriage 109 is moved forward by the section h of the cam groove 164' to the position substantially as shown in Fig. 3, and during such forward movement of the carriage, the thread-carrying members 119, on the elevated table 118, pass through the incisions 78' previously made in the book signatures 78, and inlay in the incisions 78' the threads 127 carried by the prongs 119. During the forward movement of the carriage 109, the table 118 associated with it, is held elevated by the portion b of the revolving cam 110. When the table 118 has been advanced and the thread-carrying devices 119 are beyond the incisions 78', (Fig. 15), the table 118 is given a short, relatively quick upward thrust or movement by the section c of the revolving cam groove 110', (Fig. 6). By this upward movement of the thread-carrying devices, the complementary prongs 119' upon the edges of which the threads rest, press upwardly the various threads 127, causing them to be seated in the bottom of the incisions 78' and placing them under increased tension. Practically simultaneously with such upward thrust or following immediately thereupon and while under the increased tension referred to, the threads are cut, leaving a length of thread in each of the incisions 78' as shown in Fig. 16ª.

*Thread-cutting mechanism.*

The severing of the respective threads 127, after they have been inlaid in the incision and at the moment of greatest intension thereof, is effected by a cutter bar 165, (Fig. 14), having a plurality of oblique slots 165' through which the threads 127, have been drawn by the forward movement of the carriage 109, as previously described. One side of each of the slots 165' is sharpened, as seen at 165''. The bar 165 is operably disposed in a recess 166 in the bottom of the stationary jaw 4 of the clamp, and is held suspended within said recess 166, (Fig. 15), by a flanged rail 167, adjustably secured to said stationary jaw 4 and upon which it is arranged to slide. Between the cutter bar 165 and the face of the recess 166, is disposed a shear plate 168, in relation to which the cutter bar 165 operates. This shear plate 168 is provided with oblique slots 168' which coincide with the slots 165' in the cutter bar 165, and through which registering slots 165' and 168' of the cutter bar 165 and shear plate 168 respectively, the threads 127 are carried. Now when the cutter bar 165 is moved in the direction indicated by the arrow, (Fig. 14), the cutting edges 165'' pass by the slots 168' in the shear plate 168 and in so doing sever the threads that are drawn taut therethrough, as explained. The operation of the cutter bar 165 is a short, quick one, and takes place while, or immediately after, the table 118 is thrust upwardly by the portion c of the cam 110. The means for operating this cutter bar 165 consists of a rocker arm 169 oscillatably mounted intermediate its ends upon one side of the stationary jaw 4. At one end the rocker arm 169 is pivotally connected with the cutter bar 165, and at its other end, the rocker arm is connected by links 170 with one end of a shaft 171, journaled in suitable bearings 171' and 171'', (Figs. 3 and 4, respectively). On the other end of said shaft 171 is fixed an arm 172, to which is pivotally connected a lever 173 that is also fulcrumed in the support 143. Intermediate the ends of said lever 173 is journaled a roller 174, which is disposed in the groove 174' of a cam wheel 174'', by which the periodical oscillation of said shaft 171 and of the cutter bar 165 is accomplished, at the moment, as stated, that the threads are in greatest tension. For this purpose, the cam groove 174', as seen in Fig. 14ª, is composed of two sections l and m, the section m being a short arcuate curve lying in a radius greater than the section l and arranged to impart an upward motion to the roller 174 riding therein, whereby through the connections described, the cutter bar 165 is given a short reciprocal movement by which the threads 127 are severed. The cutter bar thereupon is returned to normal position of rest, as shown in Fig. 14, when the roller 174 enters upon the cam groove section *l*.

During the various operations of the machine described, beginning with the inlaying of the threads 127, and ending with the cutting of the threads, it will be observed that the thread ends have been held tightly gripped by the fingers 134 on the finger bar 133. So soon as the severance of the threads 127 has occurred, the release of the gripped ends of the threads takes place, and this release is effected by the axial revolution of the shaft 139, which is produced when the roller 144, moves from the groove section *g* of the cam wheel 145 to the groove section *f* thereof, and thereby transmits its movement to the lever 142, that is connected to the shaft 139. When the threads have thus been released, the table 118 is caused to descend relatively to the carriage 109, the descending movement beginning when the roller 120 enters the section *d* of the cam groove 110' of the revolving wheel 110, and continuing until the roller 120 enters into the section *e* of the cam groove, which is concentric and hence brings the table 118 to (a condition of) rest. Concurrently with this vertical descension of the table 118 from its elevated position, (Figs. 3 and 5), to its lowered normal position, (Fig. 1), the carriage 109 upon which the table 118 is mounted for relative movement, is retracted and such retraction of the carriage is effected by the section *j* of the cam groove 164' in the cam wheel 164, which section *j* draws back the roller 163 and with it the carriage 109, through the intermediate connections already referred to. Following the return to normal position of the table 118 and the carriage 109, the clamp jaw 34 is operated to relieve its pressure upon the signatures or book unit 78 that has been held securely clamped during the various operations referred to, and by the mechanisms described. Such release of the movable clamp jaw 34, is brought about when the roller 73, journaled in the end of the bar 72, (Fig. 2), enters the eccentric section 74" of the groove 74' in the revolving cam wheel 74, and through the connections detailed, transfers its motion to the clamp operating toggles 60 and 61.

*Adjustable mechanism for carriage 109.*

In order to cause a proper co-operation of the thread-gripping means, (which includes the bar 133 and the gripping fingers 134 thereon, Fig. 9, operably mounted in the movable clamp jaw 34), and the thread-severing means, (which includes the cutter bar 165, operably associated with the stationary jaw 4), with the table 118 carrying the thread-inlaying devices 119, it is imperative that the movement of this table forth and back relative to the clamp jaws 34 and 4 be predetermined. It is therefore required that the distance of the forward movement of the table 118 shall be constantly a fixed one because the jaw 4 carrying the cutter mechanism is stationary or fixed. The distance of the backward movement of the table 118, however, must be determined relative to the position of the jaw 34 which is adjustable; in other words, the adjustment of the movable clamp jaw 34 as required by different book thicknesses, must be accompanied by a simultaneous adjustment between certain of the instrumentalities for reciprocating the carriage 109 and the table 118 mounted thereon, and by which adjustment the distance of the return or rearward movement of the table 118 and carriage 109 is variably controlled, while the distance of travel forward of the table remains constant.

Referring to Fig. 3 and Fig. 3ª, it will be seen that the link 148 is composed of two members 148' and 148" each provided with an inwardly extending arcuate bearing 149 and 149' intermediate the ends thereof and corresponding to and operable upon the arcuate face 150' of a shoe 150 that is secured in the end of the lever 146. Each of the link members 148' and 148" is recessed as at 151 and 151' to embrace and accommodate the shoe 150, in engagement with which the link members 148' and 148" are held by a bolt 152 which pivotally connects one end of said link members to one end of the connecting rod 147. The other ends of said members are provided with elongated slots 153 and 153' which fit over lugs 154 and 154' projecting from a square nut 155 that is mounted upon a screw 156, journaled in said lever 146, and which nut 155 is disposed in a slotway 146' in said lever 146. On the end of said screw 156 is secured a bevel gear 156' in mesh with which is a bevel pinion 157', secured upon one end of a shaft 157, journaled in said lever 146. On the other end of said shaft 157 is fixed a spiral gear 157" which is arranged in mesh with a spiral gear 158, secured upon the vertical shaft 55, which has been previously described, and which is rotatable through the medium of the gear 56, bevel pinion 57, shaft 58 and hand wheel 59 as before explained.

When the hand wheel 59 is manipulated, as heretofore explained, the movable clamp jaw 34 is moved to adjust same relative to the stationary jaw 4. At the same time, the screw 156 is rotated through the media just recited. By such rotation of the screw, the nut 155 is caused to move relatively to the screw, carrying with it the link 148, whose arcuate face 149 and 149' travel on the arcuate face 150' of the shoe 150. The arc of the shoe 150 being concentric with the pivotal connection of the connecting rod 147 with the carriage 109, it will be seen that the movement of the link 148 relatively to the face 150' does not affect the radius of the connecting rod and hence the distance of movement of the carriage in a forward direction is always constant. Since, however, the relative distance between the pivotal bearing of the lever 146 and the pin or bolt 152, connecting the link 148 with the connecting rod 147, is changed by the operation of the screw 156, the distance of rearward travel or movement of the carriage 109 and the table 118 is variably controlled and in concordance with the movable jaw of the clamp. In this wise the relative positions of the thread-inlaying devices, the thread-gripping means and the thread-cutting means are accurately controlled.

*Signaling arrangement.*

Audible, visible, or other, signaling means are provided to indicate when any one, or more of the threads employed fails to be held in tension or taut, that is to say, when it is not held gripped and drawn firmly into the incisions in the back of the signatures, a condition occurring, for instance, when any of the threads break.

A convenient form of audible signal for this purpose is illustrated in detail diagrammatically in Fig. 13, and represents but one of many forms of signaling devices, that may be employed whether of the audible, or visible type.

On the front of the table 118 is fulcrumed a plurality of levers 180, (Figs. 2, 3, 6, and 13), the ends 180' of each of which is arranged to be held in engagement with a contact plate 181', embedded in an insulating body 181, that is inset in the table 118, by helical springs 182, which exert tension against the other ends 180'' of said levers 180. This contact plate 181' is in an electrical circuit, which includes a source of energy, as a battery 183, an electric bell 184, a switch 185, and a wire 186 by which the flow of current is grounded through the machine and hence through the various levers 180. The threads 127 after passing through the tension devices 128, in rather loose manner, over grooves 187 in the top of said levers 180, as seen in Fig. 2, but when the ends of the threads are gripped and the inlaying thereof occurs by the forward movement of the table 118, the threads are placed under tension, and such tension moves the levers 180 about their fulcrums and against the tension of the springs 182. At the same time, the ends 180' of said levers 180 are moved out of engagement with the contact plate 181'. The switch 185, shown in Fig. 13 diagrammatically, is the same as the switch or contact arm 185, shown in Fig. 1, and mounted upon the shaft 111, and is arranged to make contact with a contact 185' that is secured to the frame of the machine, and which is the equivalent of the wire shown in Fig. 13, at 186.

Now so long as the levers 180 are held under tension of the threads 127, in manner related, so that the ends 180' of the levers 180 are out of contact with the plate 181', the wiping of the switch or contact arm 185 against the contact 185', will not complete the circuit. When, however, any of the ends 180' of the levers 180 are thrust into contact with the plate 181', owing to a lack of thread tension, the circuit will be closed when the contact arm 185 strikes the contact 185' and thereby the bell will be sounded, indicating that one or more of the threads have failed to be inserted in the signature incisions.

What I claim, is:

1. A machine for binding together signatures to form a book unit comprising means for making incisions in the back of the signatures and bending the loose tongues at one side of the incisions out of alinement with the tongues at the other side of the incisions, and means to operate said means.

2. A machine for binding together signatures to form a book unit comprising means for making incisions in the back of the signatures and simultaneously bending the loose tongues at one side of the incisions at an angle to the plane of the signatures, and means to operate said means.

3. A machine for binding together signatures to form a book unit, comprising means for making oblique incisions across and inwardly at an angle to the back of the signatures and simultaneously deflecting the cut portions of the signatures at one side of the incisions, and means to operate said incision-making means.

4. In a machine of the character described, means for making oblique incisions in the back of signatures forming a book unit, and simultaneously deflecting the free portions of the signatures at one side of the incisions.

5. In a machine of the character described, means for making oblique incisions across the back of signatures, and means for inlaying binding strands in said incisions.

6. In a machine of the charter described, means for making oblique incisions across the back of signatures, means for inlaying binding strands in said incisions, and means for severing said strands to leave sections thereof in said incisions.

7. In a machine of the character described, means for making oblique incisions in the back of signatures, means for inlaying binding strands in said incisions and means to draw said binding strands to the bottom of said incisions.

8. In a machine for binding signatures, means for making oblique incisions in the back of the signatures, thread carrying devices, means to cause said thread-carrying devices to pass through said incisions and inlay threads therein, and means for severing the threads to leave sections thereof in said incisions.

9. In a machine for binding signatures, means for making oblique incisions in the back of the signatures and simultaneously deflecting the cut portions at one side of the incisions, and means to inlay threads in said incisions.

10. In a machine for binding signatures, means for making oblique incisions in the back of the signatures, means for inlaying threads in said incisions, means for holding the ends of the threads during the inlaying thereof, and means to sever the threads after the inlaying thereof.

11. In a machine for binding signatures, means for making oblique incisions in the back of the signatures, thread-carrying devices, means to move said thread-carrying devices through said incisions to inlay the threads therein, means to grip the thread ends during the movement of the thread-carrying devices through the incisions, and means to sever the threads after the inlaying thereof to leave sections of thread in said incisions, said thread-gripping means operable after the severance of the threads to release the same.

12. In a machine for binding signatures, a support for the signatures and a clamp, means for making oblique incisions across the back of the signatures, means for inlaying threads in said incisions comprising thread-carrying devices, means to move said thread-carrying devices in line with the incisions, means to grip the loose ends of the threads carried in said devices, means to move said thread-carrying devices through the incisions and relatively to the gripped threads whereby they are inlaid in the incisions, and means to sever the threads after the inlaying thereof, said thread-gripping means operable after the severance of the threads to release same.

13. A machine for binding signatures comprising a signature support, a clamp for the signatures, means to make oblique incisions in the plane of the signatures, means to inlay determinate lengths of continuous threads in said incisions, comprising means to grip the ends of the threads, means operable through said incisions and relatively to the gripped threads to inlay same in the incisions and means to sever the threads after being inlaid in said incisions, said gripping means actuable after the severance of the threads to release the ends gripped and thereby leave determinate lengths of threads in said incisions.

14. A machine for binding signatures comprising a frame, a series of knives reciprocable therein to make oblique incisions in the plane of the signatures, and means to inlay sections of (continuous) threads in said incisions comprising devices in which the loose ends of said threads are carried, means to move said devices in line with the incisions, means to grip the ends of the threads, means to move said devices through the incisions and relatively to the gripped threads to inlay same in the incisions, means to sever the threads after the inlaying thereof, and means to operate said means in the order named.

15. A machine for binding signatures comprising a frame, a signature support, a clamp for the signatures, a plurality of knives mounted for sliding movement in said frame, means to reciprocate said knives to cause same to make incisions in said signatures, means to inlay threads in said incisions, means to sever the threads after the inlaying thereof, and means to operate said means in the order named.

16. A machine for binding signatures comprising a frame, a signature support, a clamp for said signatures, a plurality of obliquely disposed knives mounted for sliding movement in said frame, means to reciprocate said knives to cause the same to make oblique incisions in said signatures, thread-carrying devices, means to move said devices through said incisions to inlay the threads carried thereby in said incisions, means to sever the threads after the inlaying thereof to leave sections of thread in the incisions, and means to operate all said means in the order named.

17. A machine for binding signatures comprising a frame, a clamp for the signatures, a support for the signatures, a slide operable in said frame, a plurality of knives obliquely disposed in said slide and at an angle to the vertical, said knives having beveled ends, and means to operate said slide to cause said knives to make incisions in the back of the signatures and simultaneously deflect the cut portions at one side of the incisions.

18. A machine for binding signatures comprising a frame, a clamp for the signatures, a support for the signatures having oblique slots therein, a slide operable in said frame, beveled knives secured in said slide and disposed at an angle to the vertical, means to operate said slide to cause said knives to pass through the slots in said signatures support and make oblique incisions in the signatures, and simultaneously deflect the cut portions at one side of the incisions from the plane of the signatures, and means to inlay in said incisions determinate lengths of thread.

19. A machine for binding signatures to form a book unit, comprising means to clamp the signatures, means to make oblique incisions in the back of the signatures, means to inlay determinate lengths of thread in said incisions, means to sever the threads after the inlaying thereof such determinate lengths, and signalling means to indicate when the threads fail to be inlaid in any one or more of the incisions.

20. A machine for binding signatures to form a book unit, comprising means to clamp the signatures, means to make incisions obliquely across the back of the signatures, means to inlay threads in said incisions, means to seat the threads in said incisions after the inlaying thereof, and means to sever the threads.

In testimony whereof I have set my hand.

JOHN A. DAVIS.